(12) United States Patent
Mei et al.

(10) Patent No.: US 7,846,230 B2
(45) Date of Patent: ***Dec. 7, 2010

(54) DIESEL SOOT PARTICULATE FILTER MEDIUM

(75) Inventors: Feng Mei, Ghent (BE); Eddy Lambert, Deerlijk (BE)

(73) Assignee: NV Bekaert SA, Zwevegem (BE)

( * ) Notice: Subject to any disclaimer, the term of this patent is extended or adjusted under 35 U.S.C. 154(b) by 1316 days.

This patent is subject to a terminal disclaimer.

(21) Appl. No.: 10/556,571

(22) PCT Filed: May 10, 2004

(86) PCT No.: PCT/EP2004/050739

§ 371 (c)(1),
(2), (4) Date: Nov. 14, 2005

(87) PCT Pub. No.: WO2004/104386

PCT Pub. Date: Dec. 2, 2004

(65) Prior Publication Data

US 2006/0277881 A1    Dec. 14, 2006

(30) Foreign Application Priority Data

May 23, 2003   (WO) .................. PCT/EP03/50190

(51) Int. Cl.
*B01D 39/10*   (2006.01)

(52) U.S. Cl. .................. 55/525; 55/486; 55/487; 55/488; 55/489; 55/DIG. 30; 95/285; 95/287

(58) Field of Classification Search .................. 55/482, 55/485–489, 522–528, DIG. 10, DIG. 30; 95/141; 96/108, 135, 153, 154; 210/487, 210/489, 492, 496, 499, 510; 422/171, 177, 422/180, 211, 222; 502/60, 64, 70, 416
See application file for complete search history.

(56) References Cited

U.S. PATENT DOCUMENTS 3,087,233 A    4/1963   Turnbull
(Continued)

FOREIGN PATENT DOCUMENTS

DE    41 41 580 A1    6/1993
(Continued)

OTHER PUBLICATIONS

Feng Mei, U.S.PTO Office Action, U.S. Appl. No. 10/497,907, Jul. 27, 2006, 8 pages.
Feng Mei, U.S. PTO Notice of Allowance, U.S. Appl. No. 10/497,907, Sep. 19, 2007, 6 pages.
International Search Report for PCT/EP2002/14913, Apr. 2, 2003, 3 pgs.

*Primary Examiner*—Angela Ortiz
*Assistant Examiner*—Karla Hawkins
(74) *Attorney, Agent, or Firm*—Foley & Lardner LLP (57) ABSTRACT

A diesel soot particulate filter medium, as subject of the invention comprises fibers, preferably metal fibers. The diesel soot particulate filter medium has a thickness T between its inflow side and its outflow side being equal or more than 5 cm. The S/V at the inflow side is preferably more than 50 m²/m³ and the S/V at the outflow side is preferably less than 80000 m²/m³, whereas S/V increases stepwise or gradually from the inflow side to the outflow side. S is the sum of all mantle surface of the fibers present in a volume V.

24 Claims, 3 Drawing Sheets

U.S. PATENT DOCUMENTS

| | | |
|---|---|---|
| 3,505,038 A | 4/1970 | Luksch et al. |
| 3,690,606 A | 9/1972 | Pall |
| 4,126,560 A | 11/1978 | Marcus et al. |
| 5,830,415 A | 11/1998 | Maeda et al. |
| 7,311,751 B2 * | 12/2007 | Mei et al. .................... 55/527 |
| 2003/0084788 A1 | 5/2003 | Fraser, Jr. |

FOREIGN PATENT DOCUMENTS

| | | |
|---|---|---|
| DE | 196 11 150 A1 | 5/1997 |
| DE | 197 52 143 A1 | 5/1999 |
| EP | 0 612 551 B1 | 8/1994 |
| EP | 1 018 357 A1 | 7/2000 |
| EP | 1317950 A1 * | 6/2003 |
| JP | 05-305207 A | 11/1993 |
| JP | 2002-058939 A | 2/2002 |
| JP | 2002-097924 A | 4/2002 |
| WO | WO 97/04152 A1 | 2/1997 |
| WO | WO 01/00971 A1 | 1/2001 |
| WO | WO 02/40837 A1 | 5/2002 |

* cited by examiner

DIESEL SOOT PARTICULATE FILTER MEDIUM

FIELD OF THE INVENTION

The present invention relates to diesel soot particulate filters and to diesel soot particulate filter medium.

BACKGROUND OF THE INVENTION

Diesel soot particulate filters comprising fibers such as metal or ceramic fibers are well known.

JP2002058939 describes a diesel soot filter, which comprises a construction of porous materials, for which the meshes of the filter have been made finer in the direction of the flow of the exhaust gas to be filtered.

The filter either comprises several filter medium layers, one adjacent to the other, for which each layer has a defined mesh coarseness, or as an alternative the mesh coarseness changes gradually over the depth of the filter medium.

SUMMARY OF THE INVENTION

It is the object of the present invention to improve the filtration properties of filters having such gradually changing mesh coarseness or filter fineness for the purpose of diesel soot filtration when fibers, as an example metal fibers or ceramic fibers are used to provide the filter media.

A diesel soot particulate filter medium as subject of the invention comprising fibers and the diesel soot particulate filter medium having an inflow side and an outflow side. The diesel soot particulate filter medium as subject of the invention is characterized in that the filter medium thickness T between said inflow side and said outflow side is equal or more than 5 cm and the S/V at said inflow side being more than 50 $m^2/m^3$ while the S/V at the outflow side is less than 80000 $m^2/m^3$ and S/V increasing stepwise or gradually from said inflow side to said outflow side.

S is to be understood as the sum of all mantel surfaces of the fibers being present in a volume V.

At the inflow side of the diesel soot particulate filter medium as subject of the invention, the S/V is more than 50 $m^2/m^3$, preferably more than 100 $m^2/m^3$ or even more than 300 $m^2/m^3$. Advantageously, the S/V at the inflow side is less than 1000 $m^2/m^3$.

At the outflow side of the diesel soot particulate filter medium as subject of the invention, the S/V is less than 80000 $m^2/m^3$, preferably less than 50000 $m^2/m^3$, such as less than 30000 $m^2/m^3$, preferably less than 28000 $m^2/m^3$ or even less than 25000 $m^2/m^3$. Advantageously, the S/V at the outflow side is more than 15000 $m^2/m^3$.

The diesel soot particulate filter medium as a subject of the invention may comprise several layers of fiber media, one adjacent to another. Each layer has an S/V being essentially equal throughout the whole volume V of the layer. The layers may be spaced from each other using appropriate spacing means, or may be present one in contact with the other.

The term "layer" herein used it to be understood as a volume-part of the filter medium, which has substantially equal properties throughout its volume.

The S/V is stepwise increasing from the inflow to the outflow side of the filter medium.

Alternatively, the diesel soot particulate filter medium as subject of the invention may comprise only one filter medium, for which the S/V gradually changes through the thickness of the media. The S/V is approximated by calculating the S for a volume V, being a section of the filter medium perpendicular to the flow direction, and having a thickness approximating 0. The S/V is gradually increasing from the inflow to the outflow side of the filter medium.

The term "filter medium thickness T" is to be understood as minimum distance between the inflow side and the outflow side of the diesel soot particulate filter medium. In case the diesel soot particulate filter medium comprises several individual layers of filter media, T is to be understood as the sum of minimum thickness' $t_i$ of each individual layer i. T is more than 5 cm, but advantageously, T is more than 8 cm or even more than to 10 cm, such as more than 15 cm or even more than 20 cm.

The diesel soot particulate filter medium as subject of the invention comprises or even consists of fibers.

Preferably, the fibers used for the filter medium, are metal fibers, such as bundle drawn or coil shaved fibers. Alternatively, metal wool may be used.

The alloy of metal or steel may be chosen dependent on the temperature range, which is to be withstood by the metal fibers. Stainless steel fibers of AISI alloys of the 300- or 400 series, or alloys such as INCONEL® Inconel® (an austenitic nickel-chromium-based superalloy) are to be preferred. In case high temperatures are to be withstood, alloys comprising Fe, Al and Cr are preferred, such as FECRALLOY (a high temperature iron-based superalloy).

Most preferably, the filter medium comprising metal fibers, is sintered in order to bond the metal fibers.

The term "sum of mantel surfaces S" is defined as the accumulation of all mantel surfaces or the fibers, present in a volume V of the filter medium. The mantel surface of a fiber is the surface being essentially parallel to the axis of the fiber. This mantel surface may be calculated as $$S = L * A$$

Wherein

L is the sum of the fiber lengths present in volume V;

A is the perimeter of the fibers present in volume V.

Fibers, providing the filter medium, are characterized by an equivalent diameter (D), a surface shape and an "average length (LM) to equivalent diameter"—ratio (LM/D).

With the term "equivalent diameter" is meant the diameter of an imaginary circle, which has the same surface as the surface of a fiber section, cut perpendicular to the major axis of the fiber. Fibers used to provide the layers of the filter medium as subject of the invention, may be in the range of 0.5 µm to 100 µm, such as in the range of 2 µm to 75 µm, as an example in the range of 12 µm to 50 µm, e.g. 25 µm, 35 µm or 40 µm.

The ratio average length LM over equivalent diameter D, being LM/D is preferably more than 5 or 10 or even more than 25 or 50, most preferably more than 100.

The shape of the surface of the fibers may vary to a large extend. This shape is defined by the geometrical figure of a radial cross section of the fiber. This may e.g. be rectangular or square, circular, triangular, or comprise a rather serrated section circumference. For most fibers used, the shape of a radial section is essentially identical over the whole length of the fiber. The shape defines to a large extend the perimeter A of the fibers present in the diesel soot particulate filter medium.

Possibly, if the filter medium comprises different layers, the layers may be sintered to each other to bond the different layers to each other. The different layers may be sintered and brought to the required porosity separately during a first sintering cycle. After being superposed to each other, they are sintered to each other during a second sintering cycle. Alternatively, the different layer may be superposed to each other before sintering. During one sintering cycle, the layers are sintered and bond to each other by the sintering operation.

In case the metal fibers are obtained by shaving from a coiled plate as described more in detail in WO97/04152, a radial section of such metal fiber is essentially rectangular. The length of both sides are to be taken into account for calculating S of the volume comprising such fibers.

In case the metal fibers are obtained by bundled drawing, the metal fibers have an essentially circular of pentagonal radial section. It was found that the circumference of the fiber radial section is sufficiently approximated by using the circumference of the imaginary circle, having the same surface as the surface of the radial section of the fiber.

The S/V values of the diesel soot particulate filter medium may be tuned by adjusting the porosity of the medium, or a the porosity of a layer being part of the medium, or by selecting the fiber surface shape and the fiber equivalent diameter.

As an example, a diesel soot particulate filter medium is provided having a uniform porosity over its total volume. At the inflow side, relatively coarse fibers having a relatively large equivalent diameter are used. More towards the outflow side of the medium, the equivalent diameter of fibers decrease gradually.

In this case, whereas for each volume V chosen, an identical weight is obtained, the sum of mantle surfaces S of a volume V increases since finer fibers have an increases fiber mantle surface per fiber volume or fiber weight. As the porosity is equal over the whole volume of the filter medium, by selectively choosing the equivalent diameter of the fibers, one may provide a diesel soot particulate filter medium as subject of the invention.

Alternatively, a diesel soot particulate filter medium having a uniform porosity over its total volume may be provided, by selectively choosing the fiber cross section shape. As an example, at the inflow side, fibers having an essentially circular cross section and an equivalent diameter d may be used. The surface of the cross section of these fibers is $\pi*d^2/4$. The mantle surface of these fibers is $\pi*d*L$, where L is the length of the fiber.

Further towards the outflow side of the filter medium, fibers having an essentially square section with side length a are used. a is chosen in such a way that $a^2=\pi*d^2/4$. Therefor, d is the equivalent diameter of these square fibers. The mantle surface of these square fibers is $4*a*L$, which is larger than the mantle surface of the circular fibers at the inflow side of the filter medium.

Further towards the outflow side, rectangular fibers may be used, having a short side b and long side c. b and c are chosen in such a way that $b*c=\pi*d^2/4$, so d is the equivalent diameter of the rectangular fibers. The mantle surface of these rectangular fibers is $2*(b+c)*L$, which is larger than the mantle surface of the circular fibers and the square fibers upwards to the inflow side of the filter medium. The more to the outflow side, the dimensions of the sides b and c are chosen that the difference between b and c increases, whereas the equivalent diameter stays equal to d. hereby, the mantle surface of the fibers increase towards the outflow side of the filter medium. As over the whole filter medium volume the porosity is equal, the ratio S/V increases from the inflow to the outflow side by changing the shape of the fiber cross section.

As another example, a diesel soot particulate filter medium is provided having identical fibers throughout the whole filter medium. At the inflow side, a higher porosity is provided, whereas towards the outflow side, the porosity is decreased. A decreasing porosity means that more fiber volume is to be present per volume towards the outflow side. Since all fibers are equal, this means that more mantle surface of fibers is to be present per volume towards the outflow side. By selectively choosing the porosities, the shape of cross section and the fiber equivalent diameter, one may obtain a diesel soot particulate filter medium as a subject of the invention.

As a result, surprisingly it was found that diesel soot particulate filter media as subject of the invention, may have
improved filter efficiency up to the range of 85% to 95% or even more than 99%, and this after a short loading time. It was found that the efficiency is mainly due to the choice of the S/V ration at the outflow side, in respect of the face velocity of the gasses flowing through the filter.
an increased soot loading time and soot loading capacity even in a broad range of phase velocities from the exhaust gasses filtered. It was found that the amount of soot which can be trapped depends mainly on the dimension of the filter medium itself, in case the thickness of the filter medium, and the gradually or stepwise increasing of the S/V ratio.
A minimized pressure drop, in spite of the relatively high filter medium thickness T, as significantly high porosity's may be used, ranging from 85% up to 99.5% or even more all the way through the filter medium.

It is understood that the filter medium may be provided with catalysts to obtain an oxidation of the trapped soot. Possibly, also catalytic compounds are provided to reduce the $NO_x$-content of the exhaust gas. Different catalysts may be provided through the depth of the filter medium.

A diesel soot particulate filter medium can be used to provide a diesel soot filter comprising a diesel soot particulate filter medium as subject of the invention. The diesel soot filter may additionally comprise other elements such as a filter housing or can, and means to regenerate the filter media for removing the soot trapped on the media.

BRIEF DESCRIPTION OF THE DRAWINGS

The invention will now be described into more detail with reference to the accompanying drawings wherein FIG. 1 schematically shows a diesel soot particulate filter medium as subject of the invention.

DESCRIPTION OF THE PREFERRED EMBODIMENTS OF THE INVENTION

Figure 1:
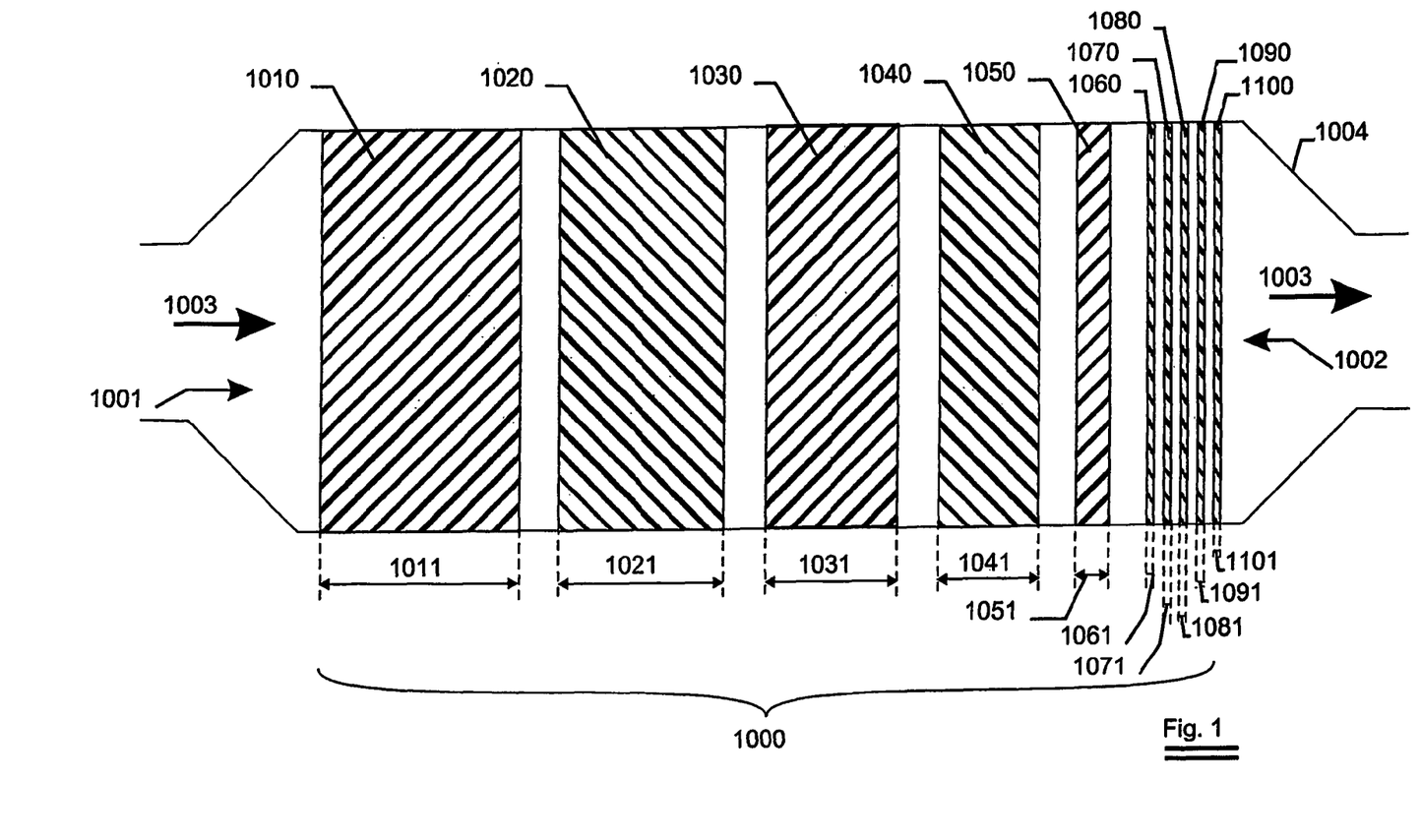

A diesel soot particulate filter medium 1000 as subject of the invention is shown in FIG. 1. A diesel soot particulate filter medium 1000, having an inflow side 1001 and an outflow side 1002 for filtration of exhaust gasses having a flow direction indicated with arrows 1003, is mounted in a filter can 1004.

The diesel soot particulate filter medium comprises 10 layers of fiber media, indicated 1010, 1020, 1030, 1040, 1050, 1060, 1070, 1080, 1090 and 1100. The layers are present one adjacent to the other. In FIG. 1, it is shown that the layers are mounted separated one from the other, however this separation is not essential for the purpose of the invention. Alternatively, they may be mounted one into contact with the other.

Each layer has a thickness, as indicated 1011, 1021, 1031, 1041, 1051, 1061, 1071, 1081, 1091, 1101.

The filter medium thickness T is to be understood as the sum of the thickness' of the layers.

For a first embodiment, the characteristics of the fiber media of the layers, consisting of metal fibers, are listed in table I.

TABLE I

| Layer number (—) | Fiber cross-section shape | Fiber perimeter (µm) | Fiber equivalent diameter (µm) | Layer thickness (mm) | Porosity (%) | S/V (m²/m³) |
|---|---|---|---|---|---|---|
| 1010 | Rectangular (54 µm * 21 µm) | 150 | 38 | 120 | 99.52 | 391 |
| 1020 | Rectangular (54 µm * 21 µm) | 150 | 38 | 100 | 99.13 | 703 |
| 1030 | Rectangular (54 µm * 21 µm) | 150 | 38 | 80 | 98.63 | 1114 |
| 1040 | Rectangular (54 µm * 21 µm) | 150 | 38 | 60 | 97.59 | 1954 |
| 1050 | rectangular (50 µm * 19 µm) | 138 | 35 | 18.50 | 96.22 | 5495 |
| 1060 | rectangular (50 µm * 19 µm) | 138 | 35 | 3.45 | 93.70 | 9152 |
| 1070 | rectangular (50 µm * 19 µm) | 138 | 35 | 3.05 | 92.88 | 10346 |
| 1080 | rectangular (50 µm * 19 µm) | 138 | 35 | 2.74 | 92.06 | 11540 |
| 1090 | rectangular (50 µm * 19 µm) | 138 | 35 | 2.48 | 91.23 | 12735 |
| 1100 | rectangular (50 µm * 19 µm) | 138 | 35 | 2.27 | 90.41 | 13929 |
| Total T | — | — | — | 392.49 | — | — |

All through the layer thickness, the fiber cross-sectional shape, fiber perimeter, fiber equivalent diameter, porosity and S/V are substantially equal. Layers 1060, 1070, 1080, 1090 and 1100 are sintered.

Figure 3:
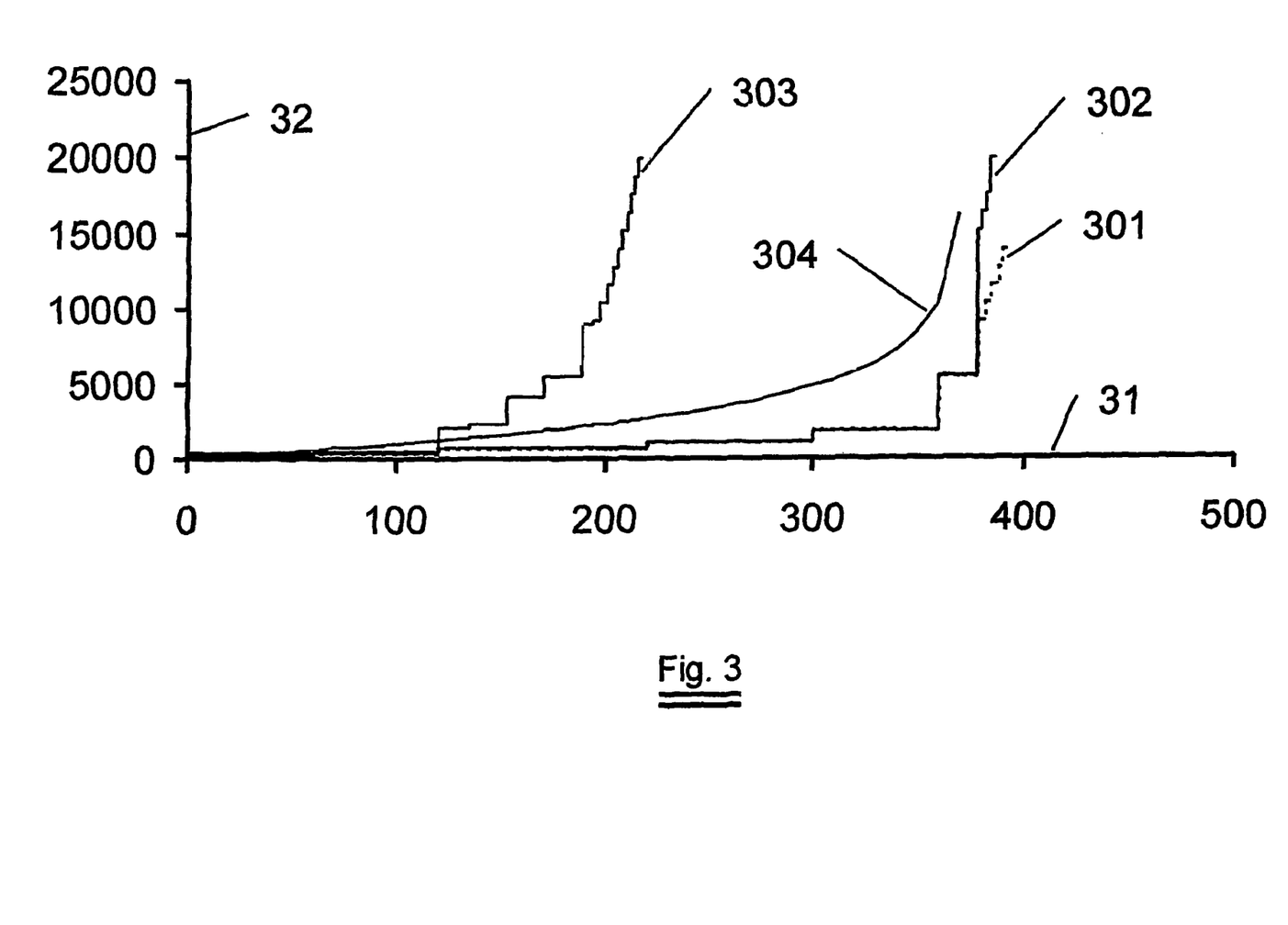
FIG. 3 shows S/V curves from the embodiments ad described herein after.

The stepwise increasing S/V in function of the location in the filter medium can be seen in curve 301 of FIG. 3. The abscissa 31 of FIG. 3 is distance between the actual location in the filter to the inflow side of the filter, expressed in mm. The ordinate 32 is the S/V value at that location, expressed in m²/m³.

The metal fibers, used to provide the fiber media, are preferably Fecralloy®-, or Aluchrome® alloy fibers. Each layer was provided as a disc having a diameter of 168 mm, and inserted in a can 1004 having a tubular shape with an identical inner diameter.

The diesel soot particulate filter medium as given in table I, was used on a diesel engine generating exhaust gasses comprising approximately 30 g/m³ soot particulate. The phase velocity of the exhaust gas through the filter was approximately 1.5 m/s.

This diesel soot particulate filter medium provided a soot filter efficiency of more than 85% after 5 minutes of loading.

An alternative diesel soot filter medium as subject of the invention, comprising 10 layers of fiber media, is provided in table II.

TABLE II

| Layer number (—) | Fiber cross-section shape | Fiber perimeter (µm) | Fiber equivalent diameter (µm) | Layer thickness (mm) | Porosity (%) | S/V (m²/m³) |
|---|---|---|---|---|---|---|
| 1010 | Rectangular (54 µm * 21 µm) | 150 | 38 | 120 | 99.48 | 418 |
| 1020 | Rectangular (54 µm * 21 µm) | 150 | 38 | 100 | 99.13 | 708 |
| 1030 | Rectangular (54 µm * 21 µm) | 150 | 38 | 80 | 98.62 | 1121 |
| 1040 | Rectangular (54 µm * 21 µm) | 150 | 38 | 60 | 97.69 | 1872 |
| 1050 | Rectangular (50 µm * 19 µm) | 138 | 35 | 18.50 | 96.22 | 5495 |
| 1060 | Rectangular (50 µm * 19 µm) | 138 | 35 | 2.09 | 89.59 | 15124 |
| 1070 | Rectangular (50 µm * 19 µm) | 138 | 35 | 1.94 | 88.77 | 16318 |
| 1080 | Rectangular (50 µm * 19 µm) | 138 | 35 | 1.8 | 87.94 | 17512 |
| 1090 | Rectangular (50 µm * 19 µm) | 138 | 35 | 1.69 | 87.12 | 18707 |
| 1100 | Rectangular (50 µm * 19 µm) | 138 | 35 | 1.59 | 86.30 | 19901 |
| Total T | — | — | — | 387.60 | — | — |

All through the layer thickness, the fiber cross-sectional shape, fiber perimeter, fiber equivalent diameter, porosity and S/V are substantially equal. Layers 1060, 1070, 1080, 1090 and 1100 are sintered.

The stepwise increasing S/V in function of the location in the filter medium can be seen in curve 302 of FIG. 3.

The metal fibers, used to provide the fiber media, are preferably Fecralloy®-, or Aluchrome® alloy fibers. Each layer was provided as a disc having a diameter of 168 mm, and inserted in a can 1004 having a tubular shape with an identical inner diameter.

This diesel soot particulate filter medium provided was tested under same circumstances as the diesel soot particulate filter medium of table I. A soot filter efficiency more than 90% after a loading time of 5 minutes.

Yet another embodiment of a diesel soot particulate filter medium as a subject of the invention is given in table III. This medium comprises 17 layers of metal fibers, all preferably out of Aluchrome®, being a stainless steel alloy comprising Fe, Cr and Al.

TABLE III

| Layer number (—) | Fiber cross-section shape | Fiber perimeter (μm) | Fiber equivalent diameter (μm) | Layer thickness (mm) | Porosity (%) | S/V (m$^2$/m$^3$) |
|---|---|---|---|---|---|---|
| 1 | isosceles triangle | 383 | 77 | 60 | 99.38 | 244 |
| 2 | Rectangular (54 μm * 21 μm) | 150 | 38 | 60 | 99.37 | 525 |
| 3 | Rectangular (50 μm * 19 μm) | 138 | 35 | 15 | 98.56 | 2094 |
| 4 | Rectangular (50 μm * 19 μm) | 138 | 35 | 18 | 98.37 | 2370 |
| 5 | Rectangular (50 μm * 19 μm) | 138 | 35 | 17.5 | 97.14 | 4149 |
| 6 | Rectangular (50 μm * 19 μm) | 138 | 35 | 18.5 | 96.22 | 5495 |
| 7 | Rectangular (50 μm * 19 μm) | 138 | 35 | 5.3 | 93.86 | 8922 |
| 8 | Rectangular (50 μm * 19 μm) | 138 | 35 | 3.45 | 93.70 | 9152 |
| 9 | Rectangular (50 μm * 19 μm) | 138 | 35 | 3.05 | 92.88 | 10346 |
| 10 | Rectangular (50 μm * 19 μm) | 138 | 35 | 2.74 | 92.06 | 11540 |
| 11 | Rectangular (50 μm * 19 μm) | 138 | 35 | 2.48 | 91.23 | 12735 |
| 12 | Rectangular (50 μm * 19 μm) | 138 | 35 | 2.27 | 90.41 | 13929 |
| 13 | Rectangular (50 μm * 19 μm) | 138 | 35 | 2.09 | 89.59 | 15124 |
| 14 | Rectangular (50 μm * 19 μm) | 138 | 35 | 1.94 | 88.77 | 16318 |
| 15 | Rectangular (50 μm * 19 μm) | 138 | 35 | 1.80 | 87.94 | 17512 |
| 16 | Rectangular (50 μm * 19 μm) | 138 | 35 | 1.69 | 87.12 | 18707 |
| 17 | Rectangular (50 μm * 19 μm) | 138 | 35 | 1.59 | 86.30 | 19901 |
| Total T | — | — | — | 217.4 | — | — |

The stepwise increasing S/V in function of the location in the filter medium can be seen in curve 303 of FIG. 3.

Yet another embodiment of a diesel soot particulate filter medium as a subject of the invention is given in table IV. This medium comprises 17 layers of metal fibers, all preferably out of Aluchrome®, being a stainless steel alloy comprising Fe, Cr and Al.

TABLE IV

| Layer number (—) | Fiber cross-section shape | Fiber perimeter (μm) | Fiber equivalent diameter (μm) | Layer thickness (mm) | Porosity (%) | S/V (m$^2$/m$^3$) |
|---|---|---|---|---|---|---|
| 1 | Rectangular (100 μm * 33 μm) | 266 | 65 | 203.14 | 99.7 | 242 |
| 2 | Rectangular (100 μm * 33 μm) | 266 | 65 | 121.88 | 99.5 | 403 |
| 3 | Rectangular (100 μm * 33 μm) | 266 | 65 | 60.94 | 99.00 | 806 |

TABLE IV-continued

| Layer number (—) | Fiber cross-section shape | Fiber perimeter (μm) | Fiber equivalent diameter (μm) | Layer thickness (mm) | Porosity (%) | S/V (m²/m³) |
|---|---|---|---|---|---|---|
| 4 | Rectangular (100 μm * 33 μm) | 266 | 65 | 40.63 | 98.50 | 1209 |
| 5 | Rectangular (100 μm * 33 μm) | 266 | 65 | 30.47 | 98.00 | 1612 |
| 6 | Rectangular (100 μm * 33 μm) | 266 | 65 | 14.54 | 96.00 | 3224 |
| 7 | Rectangular (50 μm * 19 μm) | 138 | 35 | 6.93 | 96.00 | 5811 |
| 8 | Rectangular (50 μm * 19 μm) | 138 | 35 | 2.49 | 95.00 | 7263 |
| 9 | Rectangular (50 μm * 19 μm) | 138 | 35 | 1.39 | 94.00 | 8716 |
| 10 | Rectangular (50 μm * 19 μm) | 138 | 35 | 1.19 | 93.00 | 10168 |
| 11 | Rectangular (50 μm * 19 μm) | 138 | 35 | 0.83 | 90.00 | 14526 |
| 12 | Rectangular (50 μm * 19 μm) | 138 | 35 | 0.55 | 85.00 | 21789 |
| 13 | Rectangular (25 μm * 15 μm) | 80 | 22 | 0.42 | 80.00 | 41000 |
| 14 | Rectangular (25 μm * 15 μm) | 80 | 22 | 0.35 | 80.00 | 41000 |
| 15 | Rectangular (25 μm * 15 μm) | 80 | 22 | 0.28 | 75.00 | 51250 |
| 16 | circular | 53 | 17 | 0.16 | 74.00 | 61176 |
| 17 | circular | 53 | 17 | 0.14 | 70.00 | 70588 |
| Total T | — | — | — | 486.32 | — | — |

Figure 2:
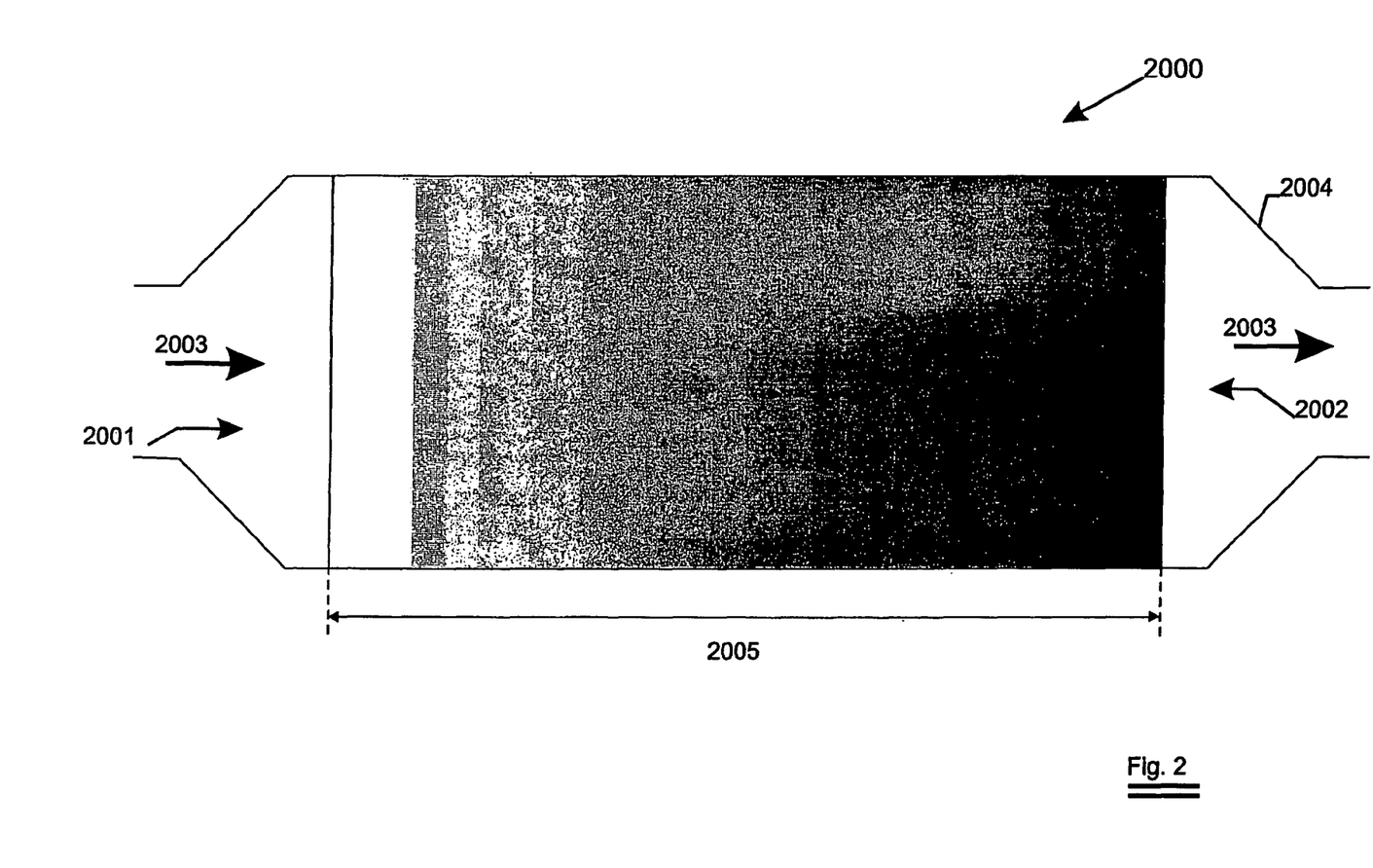
FIG. 2 schematically shows another diesel soot particulate filter medium as a subject of the invention.

Another embodiment of a diesel soot particulate filter medium 2000 as a subject of the invention is shown in FIG. 2.

A diesel soot particulate filter medium 2000, having an inflow side 2001 and an outflow side 2002 for filtration of exhaust gasses having a flow direction indicated with arrows 2003, is mounted in a filter can 2004. As an example, the thickness T indicated on FIG. 2 by 2005, is 370 mm. Over the thickness T, the S/V increases gradually from 74 m²/m³ at the inflow side 2001 to 16270 m²/m³ at the outflow side 2002. The gradual increase is preferably applied according to a curve 304 as shown in FIG. 3.

The filter is provided using stainless steel metal fibers having a rectangular cross-section with sides of 50 μm and 19 μm.

The invention claimed is:

1. A diesel soot particulate filter medium comprising fibers, said diesel soot particulate filter medium having an inflow side and an outflow side, wherein the diesel soot particulate filter medium has a thickness T between said inflow side and said outflow side equal to or more than 5 cm and S/V increases stepwise or gradually from said inflow side to said outflow side, S being a sum of all mantle surface of the fibers present in a volume V.

2. A diesel soot particulate filter medium according to claim 1, wherein the S/V at said inflow side is more than 50 m²/m³.

3. A diesel soot particulate filter medium according to claim 1, wherein the S/V at said outflow side is less than 80000 m²/m³.

4. A diesel soot particulate filter medium according to claim 3, wherein the S/V at said outflow side is less than 30000 m²/m³.

5. A diesel soot particulate filter medium according to claim 1, wherein said diesel soot particulate filter medium consists of fibers.

6. A diesel soot particulate filter medium according to claim 1, wherein said fibers are metal fibers.

7. A diesel soot particulate filter medium according to claim 1, wherein the S/V at said inflow side is less than 10000 m²/m³.

8. A diesel soot particulate filter medium according to claim 1, wherein the S/V at said outflow side is more than 15000 m²/m³.

9. A diesel soot particulate filter medium according to claim 1, wherein said diesel soot particulate filter medium comprises at least two layers of fiber media, S/V in each layer being essentially equal over a volume of the respective layer.

10. A diesel soot particulate filter medium according to claim 1, wherein said diesel soot particulate filter medium has a porosity being essentially equal over a whole volume of said diesel soot particulate filter medium.

11. A diesel soot particulate filter medium according to claim 1, wherein said fibers of said diesel soot particulate filter medium have an essentially equal equivalent diameter.

12. A diesel soot particulate filter medium according to claim 1, wherein said fibers of said diesel soot particulate filter medium have an essentially equal radial cross section.

13. A diesel soot particulate filter medium according to claim 1, wherein said fibers have having an equivalent diameter ranging from 0.5 μm to 100 μm.

14. A diesel soot filter comprising a diesel soot particulate filter medium according to claim 1.

15. A diesel soot particulate filter medium according to claim 1, wherein the diesel soot particulate filter medium comprises more than two layers of filter material between said inflow side and said outflow side, wherein each layer of filter material comprises a different S/V.

16. A diesel soot particulate filter medium according to claim 1, wherein the diesel soot particulate filter medium comprises at least a first layer of filter material, a second layer of filter material, and a third layer of filter material between said inflow side and said outflow side, wherein the first layer of filter material, the second layer of filter material, and the third layer of filter material each comprise a different S/V.

17. A diesel soot particulate filter medium comprising fibers, said diesel soot particulate filter medium having an inflow side and an outflow side, wherein the diesel soot particulate filter medium has a thickness T between said inflow side and said outflow side equal to or more than 5 cm and the diesel soot particulate filter medium comprises only one layer of filter material between said inflow side and said outflow side, wherein S/V increases gradually from said inflow side to said outflow side, S being a sum of all mantle surface of the fibers present in a volume V.

18. A diesel soot filter comprising a diesel soot particulate filter medium according to claim 17.

19. A diesel soot particulate filter medium according to claim 16, wherein the S/V at said inflow side is more than 50 $m^2/m^3$.

20. A diesel soot particulate filter medium according to claim 16, wherein the S/V at said outflow side is less than 30000 $m^2/m^3$.

21. A diesel soot particulate filter medium according to claim 16, wherein the S/V at said inflow side is less than 80000 $m^2/m^3$.

22. A diesel soot particulate filter medium according to claim 16, wherein the S/V at said outflow side is more than 15000 $m^2/m^3$.

23. A diesel soot particulate filter medium according to claim 16, wherein said diesel soot particulate filter medium has a porosity being essentially equal over a whole volume of said diesel soot particulate filter medium.

24. A diesel soot particulate filter medium according to claim 17, wherein said diesel soot particulate filter medium consists of fibers.

* * * * *